United States Patent Office

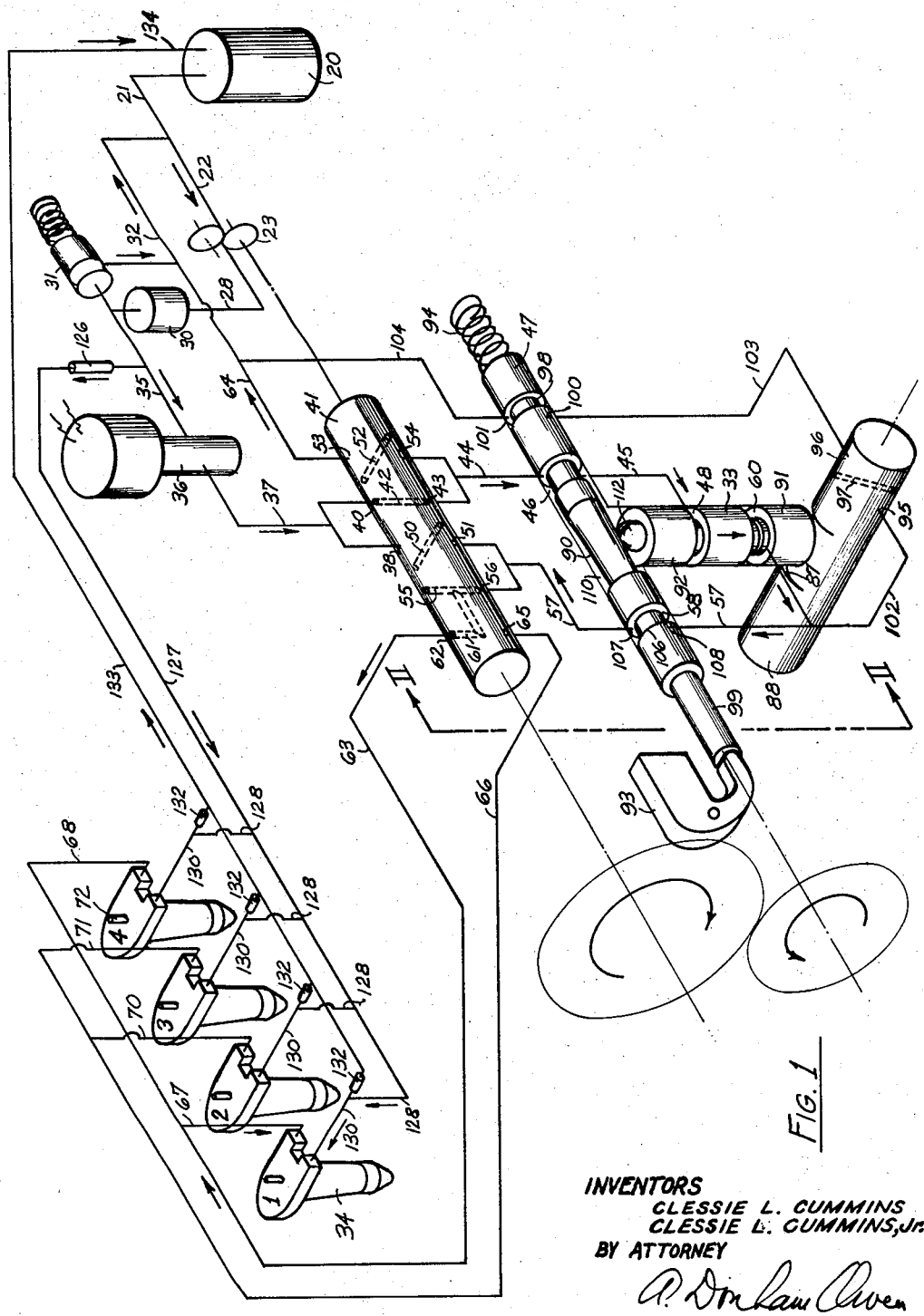

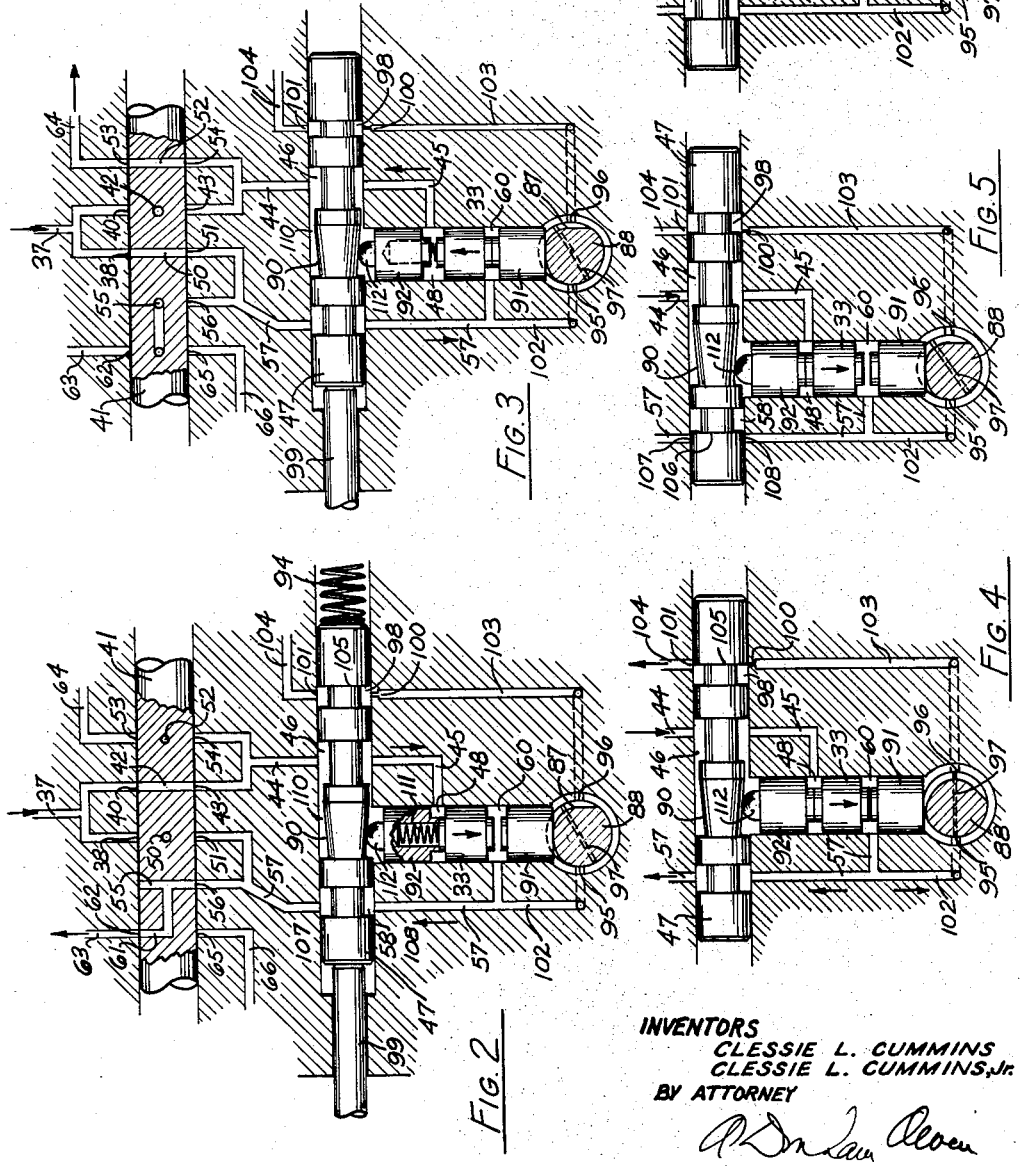

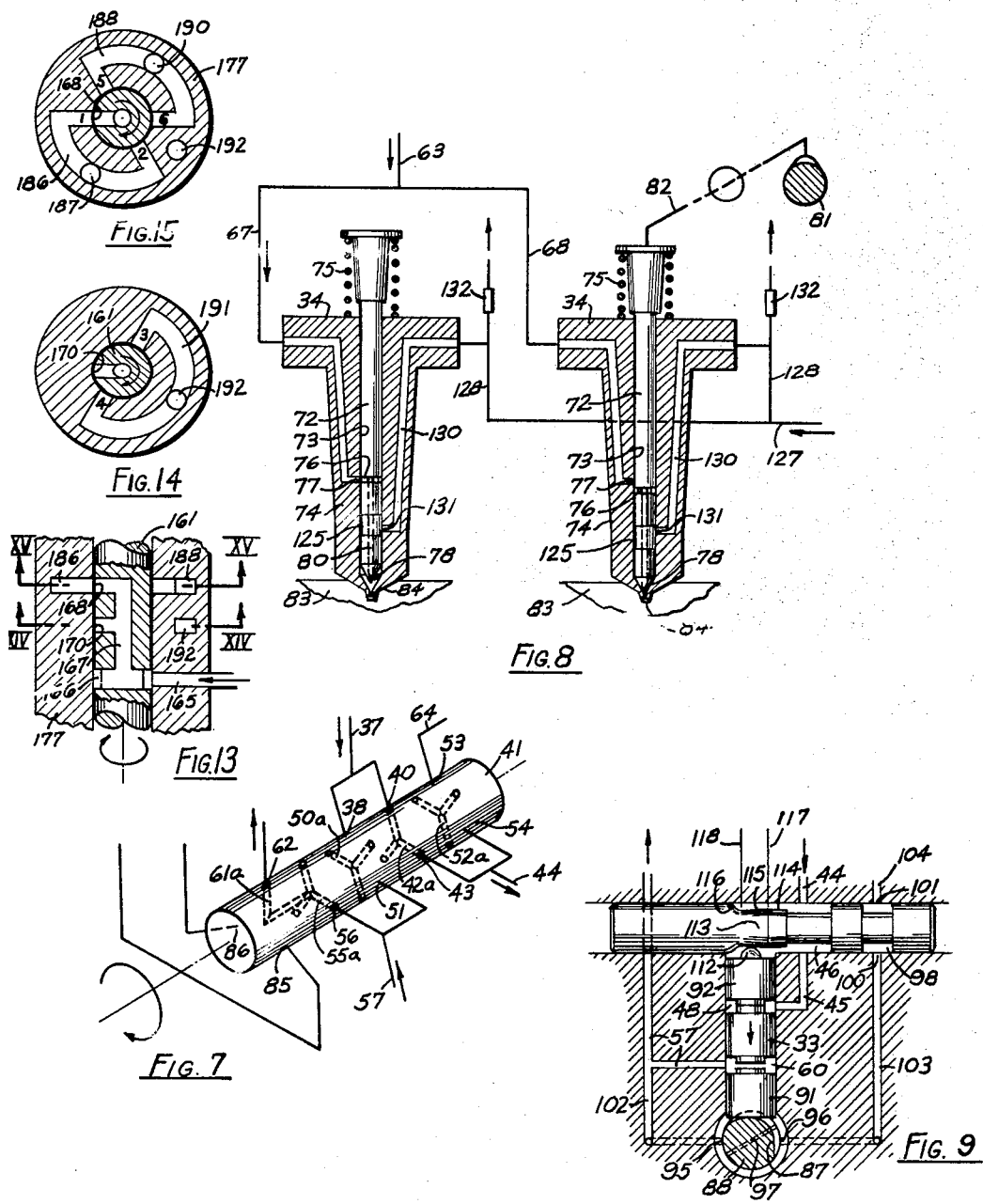

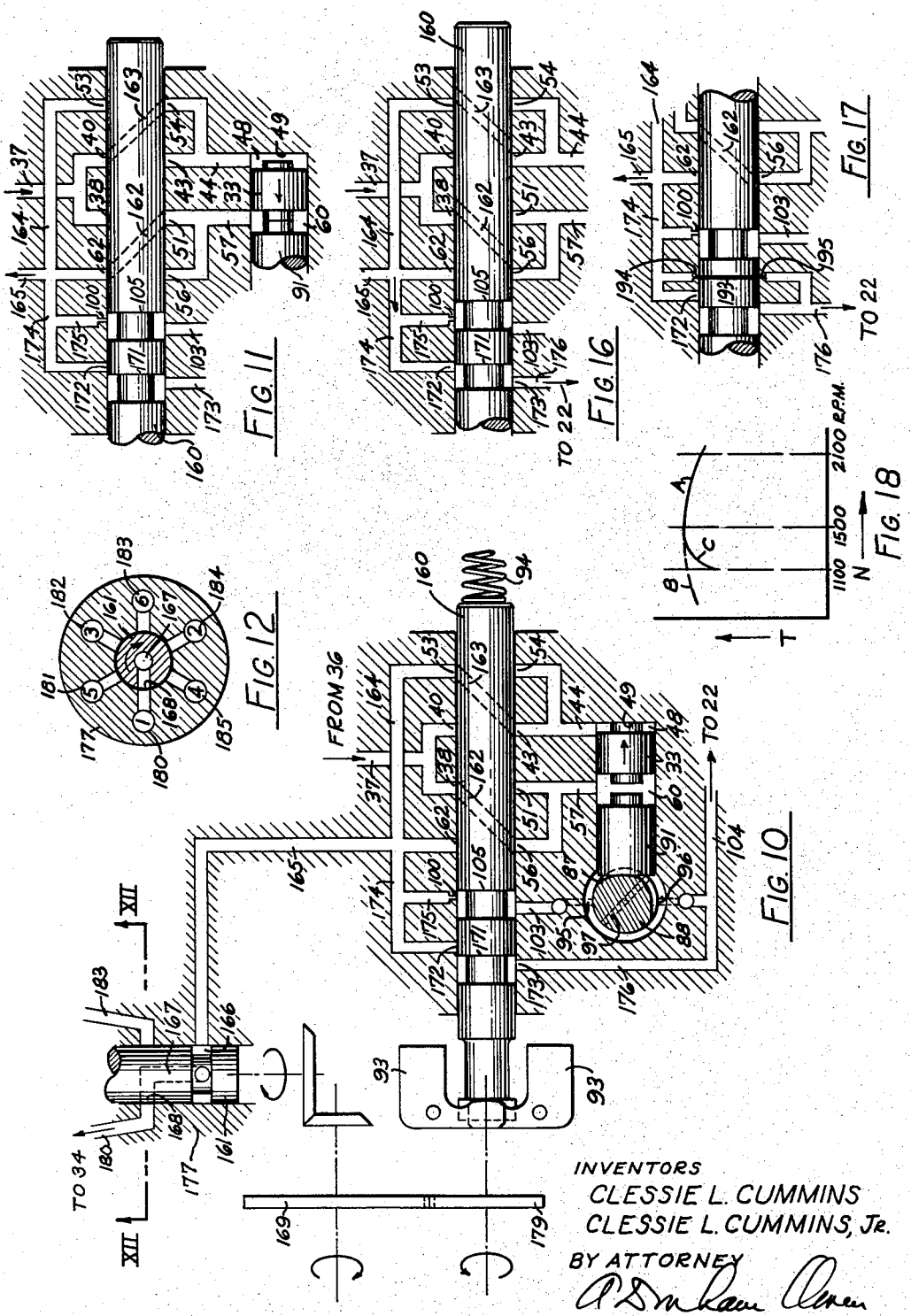

3,143,104
Patented Aug. 4, 1964

3,143,104
FUEL PUMP AND DISTRIBUTING APPARATUS
Clessie L. Cummins, 80 Cloudview Road, Sausalito, Calif., and Clessie Lyle Cummins, Jr., Mill Valley, Calif.; said Clessie Lyle Cummins, Jr., assignor to said Clessie L. Cummins
Filed Dec. 14, 1961, Ser. No. 166,730
29 Claims. (Cl. 123—140)

This invention relates to improvements in a fuel system for compression ignition internal combustion engines, often referred to as C.I. engines. This application is a continuation-in-part of application Serial Number 54,033, filed September 6, 1960, now abandoned.

A basic problem encountered in the compression ignition engine when using either of the two best known types of fuel injection systems, the positive displacement or the pressure-time types, is that of accurately controlling the metering of fuel as loads and speeds vary, as is required for vehicular use. More particularly, it is the problem of maintaining the optimum fuel-air ratio, with the throttle fully open, to provide the cleanest possible exhaust. While the subject of exhaust smoke in a diesel engine is very complicated and many variables affect the color of the exhaust, it is recognized that overfueling is one of the major causes of excessive "sooty" smoke. In addition to maintaining the most efficient combustion there is the associated problem of overfueling, which results in overloading. This is known in the art as "lugging," for example, as when a truck slows down ascending a hill and the driver fails to shift into a lower gear to decrease the load on the engine.

PRIOR ART TORQUE CONTROL BY A NON-SPEED-RESPONSIVE PRESSURE REGULATOR IN A PRESSURE-TIME SYSTEM

Attempts have been made to control torque, i.e., to change the fuel flow as the engine speed changes while the throttle is fully open. One method has been through pressure regulation in a pressure-time system. In the pressure-time system, the fuel is delivered to a mechanically operated injector plunger which, when retracted, uncovers a port in the injector body bore wall and allows fuel to be deposited in a fuel-receiving chamber under the plunger and adjacent to the combustion chamber. When the injector plunger is driven downwardly at the proper time by a cam on the engine camshaft, the fuel is forced through small orifices and into the combustion chamber where it is ignited by hot compressed air. The quantity of fuel deposited in the plunger chamber is dependent on the relationship of the pressure at the metering port and the length of time the port is uncovered, hence the name "pressure-time." As can be seen, when the engine speed decreases, the length of time the port is uncovered increases; therefore, a drop in the fuel supply pressure at the metering port must be effected to reduce the volume of fuel introduced into the engine. Unfortunately, it has so far proven virtually impossible to design a pressure regulator with the sensitivity necessary to take care of all the variables encountered in the operation of an engine under varying loads and speeds.

PRIOR AT TORQUE CONTROL BY GOVERNOR ACTUATED VALVES IN A PRESSURE-TIME SYSTEM

In Patent No. 2,670,725 is shown a means for controlling torque in a pressure-time system where, regardless of driver error in the handling of the transmission ratios on the vehicle, the fuel delivery is automatically reduced as the engine speed drops. This is accomplished by using oppositely acting valves, one being a torque control valve and the other an overspeed valve. Both these valves are controlled by a speed-responsive mechanism such as an engine-driven governor. As speed decreases, the torque control valve will begin to move in the direction which reduces the pressure of the fuel at the injector metering port regardless of the throttle opening. Conversely, as the engine speed increases, the overspeed valve will be the controlling valve and will move to shut off the flow of fuel completely to the injector when the desired maximum speed of the engine is reached.

Even though the above two types of pressure-time fuel systems have proved workable, there are many variables inherent in the two systems which must be very closely controlled and which tend to change as time passes.

PRIOR ART POSITIVE-DISPLACEMENT SYSTEMS

Heretofore, with a fuel system using a positive displacement pump, there has been no simple and completely successful method for altering the flow of fuel as speed and load change with the throttle fully open. Theoretically, a true positive displacement pump will pump an equal fuel charge over the entire speed range of the engine (for a given throttle setting). However, in practice, some fuel systems deliver slightly more fuel as speed increases, and others pump slightly less with an increase in speed. These deviations result in an engine which could accept more fuel at one speed but the pump cannot be set to deliver this additional fuel because then the engine would be overfueled at another speed.

OBJECTS OF THIS INVENTION

It is, therefore, one object of the invention to improve on the foregoing by providing a new and novel type of positive displacement fuel metering system, which will prevent overfueling of compression ignition engines.

The invention is particularly important because of the increasing problem of smog and smoke from vehicles in metropolitan areas. It is recognized that the easiest method by which engines can clean up their exhaust smoke is by better control over the fuel system. Presently, diesel truck users are sometimes forced to operate the truck engines at least than maximum horsepower in order to avoid excessive exhaust smoke at some speed range of the engine. This results in a truck's inability to ascend grades as fast as used to be possible before smoke laws were more rigidly enforced. Thus, hauling times are longer, and this results in out-of-pocket losses to the operator in addition to creating traffic congestion and undue hazards on the highways. One object of the invention, therefore, is to provide a fuel system by which the truck owner can utilize all of the horsepower which the engine is set to produce by the manufacturer without encountering excessive exhaust smoke.

Overfueling an engine at reduced speeds results in overloading or lugging, one of the most harmful conditions to which an engine can be subjected. Up to this time, it has been left to the driver to avoid lugging the engine by shifting to a lower gear. This shifting is done by most drivers, but many drivers do not do it, especially as the day wears on and fatigue manifests itself. One of the objects of the invention, therefore, is to make overloading the engine impossible even where the operator does nothing to prevent it, in other words, to make it automatic.

Positive displacement fuel pumps known and used in C.I. engines up to now are of the type that have a metering plunger mechanically operated either directly or indirectly from a rotating cam with a fixed lift on a camshaft synchronized with engine speed. In one type, commonly referred to as the "Bosch" type, the metering plunger, for all practical purposes, rides directly on its cam. The amount of fuel pumped depends on the position of a helix-shaped groove on the sidewall of the metering plunger and on the groove's relationship to a spill-off port on the bore wall. Thus, the metering plunger always moves through a fixed stroke governed by cam height and spills off during the initial part of its outward stroke what is not needed for delivery to the engine. Extremely high hydraulic pressures are created in the supply lines to the injectors because in this system the injectors have a spring controlled check valve opening directly into the combustion chamber and do not open until these high pressures have developed.

A second type of positive displacement fuel pump previously mentioned also uses a fixed height rotating cam, but with mechanism for varying the stroke of the metering piston. This method of metering a charge, as shown in the Patent No. 2,001,126, is easier to control than in the "Bosch" system because there are no critical spill-off grooves and leakage is less of a problem. But to vary the stroke of a piston while employing a fixed height rotating cam requires complicated and expensive levers and rockers. This also results in heavier governor parts as greater forces are required to move the mechanism as speed changes. In either of the aforementioned types, a distributor can be employed so that only one metering piston can serve all injectors.

One object of the invention is not only to eliminate the need for rotating camshafts and complicated levers and rollers in positive displacement fuel pumps, but also to get a better result from a simplified device. The metering mechanism, now consisting only of a hydraulically actuated metering piston, is the only oscillating part. This reduces size and cost and promotes long life of the fuel supply system. In addition to this mechanical simplification, the operating fuel pressures are greatly reduced.

Another object is to make the fuel system tamperproof in order to eliminate unauthorized changes of fuel pump settings in the field which would result in overloaded and smoky engines.

Another object of the invention is to provide at the pump a means to shut off the flow of fuel to the combustion chamber when coasting above an idle speed. This object is achieved in a preferred manner through the combination of the new pump and the injectors as outlined in Patent No. 2,997,993.

Another object is to provide a means of preventing the "runaway" of an engine which can result in its complete destruction. This condition is peculiar to most positive displacement fuel systems and arises when the fuel tank is emptied or the pump suction line is broken with the engine running.

Other objects and advantages will appear from the following description and the attached drawings, in which:

FIG. 1 is a schematic view of the new fuel supply system shown with a directly acting mechanical means for controlling torque by the engine governor;

FIG. 2 is a view partly in cross section along the line II—II in FIG. 1 showing the rotor, governor-operated plunger in its torque control position, the governor actuated tappet-like piston, the throttle shaft and its tappet-like piston, and with the hydraulically actuated metering piston ready to pump a charge of fuel to one of the fuel injectors;

FIG. 3 is a like view but with the rotor passages rotated ninety degrees and the hydraulically actuated metering piston at the end of its ejection stroke, having pumped a charge of fuel to one of the fuel injectors;

FIG. 4 is a view partly in cross section showing the throttle shaft, slidable tappets, metering piston and governor-operated plunger in the position when the engine is idling;

FIG. 5 is a like view of the same parts in the position occupied when, with the throttle held open, the engine has reached an "overspeed" condition;

FIG. 6 is a like view of the same parts in the position occupied when the vehicle is coasting;

FIG. 7 is a schematic view of the rotor of the device of FIG. 1 showing the passage and port arrangements with the invention applied to a six cylinder engine;

FIG. 8 is a view in cross section of two paired injectors supplied with metered fuel from the same distributor port;

FIG. 9 is a view in cross section of the governor plunger of FIGS. 1–6 with modifications to control idle speed and overspeed as well as torque by the mechanical means;

FIG. 10 is a schematic view of part of the fuel supply system of FIG. 1 modified to combine part of the distributing functions with the governing functions on the same rotor and to add a second distributing rotor, the purpose being to employ the metering piston to pump fuel to the injectors as it is moved in either direction but at one-half the speed of the piston shown in FIGS. 1–9;

FIG. 11 is a view partly in cross section showing the governor rotor of FIG. 10 rotated one hundred and eighty degrees to allow the metering piston to pump a fuel charge in the opposite direction;

FIG. 12 is a view in cross section taken on the line XII—XII of the second distributing rotor in FIG. 10;

FIG. 13 is a view in cross section of a modified form of the second distributing rotor of FIG. 10;

FIG. 14 is a view in cross section taken on the line XIV—XIV of the modified rotor shown in FIG. 13;

FIG. 15 is a view in cross section taken on the line XV—XV also of the modified rotor shown in FIG. 13;

FIG. 16 is a view partly in cross section of the governor rotor of FIG. 10 in the overspeed position;

FIG. 17 is a view partly in cross section of a part of the governor rotor of FIG. 10 with a modified form of torque control added to the rotor;

FIG. 18 is a graph of torque versus speed of an engine with and without a torque control incorporated in the fuel delivery system using a positive displacement pump;

FIG. 19 is a somewhat diagrammatic view illustrating a novel system of pairing fuel injectors, according to this invention.

IMPORTANT CHARACTERISTICS OF THIS INVENTION

Before a further explanation of the details of this new fuel system, some of its outstanding characteristics may be summarized in general terms:

There is the use in a compression ignition engine fuel system of a free floating piston reciprocable in a cylinder which is ported at each end to allow the pressurized fuel to act alternately on each end of the piston so the pressurized fuel acts as the source of hydraulic power to operate the mechanism. There is no positive mechanical connection between the metering and delivering piston and the fuel pump drive of the engine.

There is the combination in a four-cycle C.I. engine having mechanically actuated injectors, each with a fuel receiving chamber, of a compact cylindrical rotor, operated at a speed synchronized with the crankshaft, with its fuel feeding parts connected so that one conduit from one port will lead to two or more of said fuel receiving chambers, and the rotor will be timed in relation to the injectors so that only one of the fuel receiving chambers can receive a charge during a pumping stroke of the metering piston.

There is the use in the foregoing combination of the rotor, adapted first to connect the pressurized fuel to a first port in one end of the measuring cylinder while connecting the port in the other end of said cylinder to the suction side of the pump, whereby the flow of fuel pushes the piston to expand and fill the metering chamber to the volume permitted by the position of a cam on the throttle shaft, while exhausting the fuel from the chamber at the other end of the piston. And then when the metering chamber is filled, the further rotation of the distributor will connect the first port to the fuel receiving chamber in one of the injectors on the engine, at the same time connecting the port in the chamber at the other end of the cylinder to the pressurized fuel line, thereby applying the force of the fuel pressure (as it fills the latter chamber) to move the metering piston to deliver the charge of fuel in the metering chamber to the fuel receiving chamber in one of the injectors.

There is the use of a simple, replaceable manually operated throttle shaft fitted in a bore in the pump housing and having a cam surface to govern directly the stroke of the free floating piston and thereby control the volume of fuel fed to the engine on each stroke. By having a plurality of such replaceable throttle shafts, each with a cam of a different shape, the delivered horsepower of an engine may be varied, or by the same token, the one pump may be used on various sizes of engines when fitted with the proper throttle cam.

There is the use of a second shaft, having a cam surface, slidably fitted in a bore in the pump housing and positioned along the bore by engine-speed-created forces balanced against counterbalancing forces (e.g., springs), its function being to govern with its cam surface the stroke of the free-floating metering piston under the influence of engine speed, and thereby to control the volume of fuel fed to the engine on each delivery stroke so that as engine speed decreases, the cam surface moves to effect a shortening of the stroke of the free-floating metering piston independently of the manually operated throttle control. The purpose of this overriding control is to decrease the fuel delivery to the engine to prevent overloading or lugging as engine speed is pulled down by an increased load.

There is the use of a pair of valves, in series, one manually operated by the throttle shaft and the other governor-operated, which work in conjunction to return to the suction side of the pump the idling fuel charge that would normally be fed into the engine whenever the engine speed is above an idle and the throttle is "closed." This occurs, for example, when coasting or braking with the vehicle in gear. The governor-controlled valve also becomes the control for the idling speed of the engine.

There is the modification to the above of a compact cylindrical rotor operated at a speed bearing a fixed ratio to engine speed, the ratio being dependent on the number of engine cylinders and whether the engine is of two-cycle or four-cycle design. This rotor is also slidably fitted in a bore in the pump housing and positioned along the bore by engine speed created forces balanced against counterbalancing forces (e.g., springs), its function being to allow the pressurized fuel to act alternately on each end of the piston so that the pressurized fuel acts as the source of hydraulic power to operate the mechanism and also by the balance of forces acting on each end of the rotor to control the minimum and maximum speeds of the engine and the rate of fuel delivery at selected intervals between the two speed ranges.

There is the combination with the slidably mounted and rotating cylindrical rotor a second rotor, turning at camshaft speed for a four-cycle engine or at crankshaft speed for a two-cycle engine which receives the charges of fuel from the first rotor and distributes them to fuel-receiving chambers in mechanically actuated injectors in a properly timed sequence.

EXPLANATION OF THE DRAWINGS

*Source of Pressurized Fuel for Combustion and Hydraulic Operation of the Metering Mechanism*

The fuel supply system shown diagrammatically in FIG. 1 is of such form that it may be mounted at any convenient location on the engine where a drive synchronized to the crankshaft is available. Fuel for the engine is adapted to be drawn from the tank 20 through conduits 21 and 22 to the engine driven pump 23 herein illustrated as a gear pump.

Figure 19:
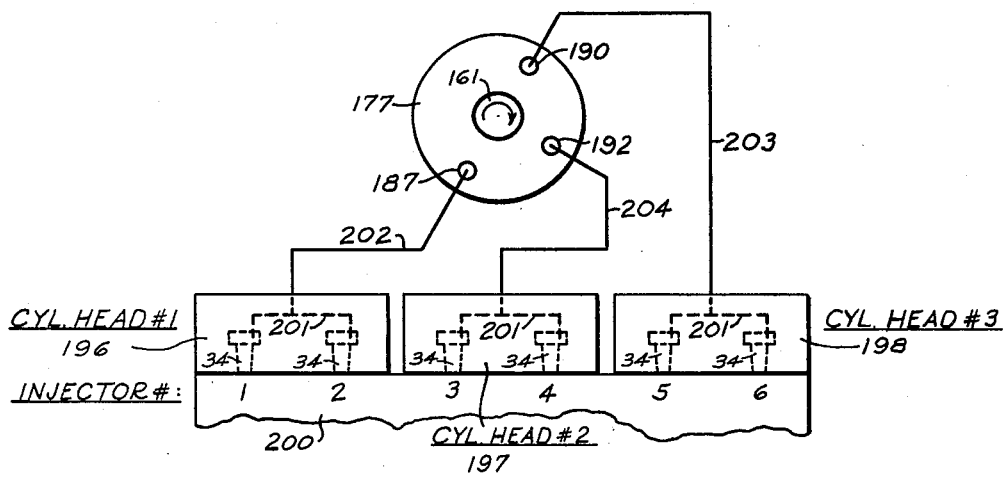

Fuel under pressure from the pump 23 flows through conduit 28 and filter 30 to the pressure regulator 31. Spill-off from the regulator 31 passes back through lines 32, 22 to the suction side of the pump 23. The function of the pressure regulator 31 is to maintain a sufficient pressure of fuel to operate the metering piston 33 through its full stroke for all engine speeds from idle to full speed. Close control of pressure by the regulator is not required, and increasing the fuel pressure in the lines to the hydraulically actuated metering or shuttle piston 33 beyond that required to move the piston does not increase the fuel delivery to the injectors 34.

From the regulator 31 fuel passes through conduit 35, shut-down valve 36, branching conduit 37 to the supply ports 38 and 40 at the compact rotor 41 which is turning at crankshaft speed. The shut-down valve 36 is shown here as an electric solenoid valve.

*Distribution of the Hydraulic Force to the Metering Mechanism and of Fuel to the Combustion Chamber*

The rotor 41 allows fuel under pressure to be alternately admitted first to one end of the metering piston 33 and then to the other end while the opposite end of the piston alternately pushes fuel either to the injectors 34 or to conduits leading back to the suction side of the pump 23. A cycle of operations of the rotor 41 and shuttle piston 33 will clearly illustrate this. In FIGS. 1 and 2, supply conduit 42 in the rotor 41 is indexed with ports 40 and 43 so that fuel under pressure can pass into the branching conduit 44, 45, via the groove 46 in the governor plunger 47 to what may be called the hydraulic force chamber 48. Supply conduit 50 in the rotor 41 is off index with its ports 38 and 51 and conduit 52 also in the rotor 41 is likewise off index with its ports 53 and 54. Thus, the fuel under pressure can only act to push the metering piston 33 downwardly, thereby increasing the volume of the chamber 48.

At the time the supply conduit 42 indexes with its ports 40 and 43, supply conduit 55 is indexed with port 56 on the branching conduit 57, through groove 58 in the plunger 47, leading to a chamber 60 at the opposite end of the shuttle piston 33. This chamber 60 may be called the metering chamber. Distributor conduit 61 is permanently connected to the passage 55. The end of conduit 61 indexes with the distributor port 62 leading to a pair of injectors 34 through conduit 63. Thus, as the hydraulically actuated metering piston 33 moves downwardly (see FIGS. 1 and 2) under the action of fuel pressure, the fuel in the metering chamber 60 is displaced through passages 57, 55, 61 and 63 to the injector 34.

In FIG. 3 is shown the rotor 41 turned through 90 degrees to illustrate how the metering chamber 60 is again charged. Supply passages 55 and 42 in the rotor 41 are now off index with their respective ports 56, 40, 43. Supply passages 50 and 52 are now indexed with their respective ports 38, 51 and 53, 54. Now the fuel under pressure from the pump 23 can enter metering chamber 60 through conduits 37, 50 and 57. This in turn forces the shuttle piston 33 upwardly and displaces the fuel in chamber 48 through conduits 44, 45, newly indexed conduit 52 and conduits 64, 32, 22 and to the suction side of the pump 23 (see FIG. 1). Thus, the metering chamber 60 has again been "charged" and the distribution cycle to the next injector 34 is ready to begin when the rotor 41 turns through another 90 degrees. However, the distributor conduit 61 will line up with another distributor port 65 connected to conduit 66 leading to another injector 34. This position of the rotor is not illustrated, as it will be clear from FIGS. 1 and 2.

As shown in FIG. 1, there are four injectors 34 representing a four cylinder engine with a firing order of 1–2–4–3. Therefore, assuming a four cycle diesel, one charge must be distributed to an injector every 180 degrees of crankshaft rotation, 720 degrees of rotation being required to fire all four cylinders. This is done as can be seen by looking at the distributor conduit 61. In FIGS. 1 and 2 it is pointing upwardly and fuel is being distributed to one injector 34. 90 degrees later the metering chamber 60 is filled and then 180 degrees later the conduit 61 is pointing downwardly and is lined up with the next distributor port 65.

In FIG. 1 is shown injectors marked 1 and 4 connected to the same conduit 63 by conduits 67 and 68 and injectors 2 and 3 connected to conduit 66 by conduits 70 and 71. Advantage is taken of the fact that one of each connected pair of injectors is closed off and will not accept a charge of fuel at the time the other injector of the pair is ready to be charged. Thus, it is possible to distribute to only one of a pair of injectors although both are connected to the same distributor port. This eliminates extra conduits and extra ports and passages in the rotor 41. In FIG. 8 is shown in cross section injectors of the type disclosed in Patent No. 2,997,993 to represent the paired injectors 1 and 4 of FIG. 1. Each comprises a plunger 72 sliding in its bore 73 in the body 74. When the plunger 72 is retracted by its spring 75, a groove 76 on the plunger indexes with a supply port 77 connecting passage 67 to the plunger chamber or fuel receiving chamber 78 through a passage 80 (shown dotted) and past a check valve (not shown) in the plunger 72 below the groove 76. The metered fuel charge from the chamber 60 can then be deposited in the plunger chamber 78. Then when the plunger 72 is driven downwardly by the cam 81 through rocker arm 82, the groove 76 passes out of index with port 77, and the fuel charge in chamber 78 is forced through the small orifices 84 and into the combustion chamber 83 where it is ignited and burned.

The shape of the cam 81 determines the length of time the plunger 72 is held seated against the end of chamber 78 and likewise the length of time the groove 76 is out of index with port 77. As can be seen from the firing order 1–2–4–3 of Fig. 1, injector number 4 injects 360 degrees after number 1 and number 1 in turn 360 degrees after number 4. Because of cam timing, groove 76 is out of index with port 77 in injector number 4 when groove 76 is indexed with port 77 in injector number 1. Since the rotor 41 is turning at crankshaft speed, one complete revolution of the rotor will bring the conduit 61 in index with port 62 so that another metered charge will pass through conduit 63. However, this time the charge will be deposited in the chamber 78 of injector number 4 rather than number 1, because the plunger 72 in number 4 will be up and the plunger 72 in number 1 will be down.

A slight modification of the passages in the rotor 41 make the hydraulically actuated metering piston 33 adaptable to serve the needs of a six cylinder engine. A study of FIG. 7 will indicate the necessary changes. In a six cylinder engine of the four cycle type, six fuel charges must be delivered to the engine during two revolutions of the crankshaft, or one charge every 120 degrees of rotation. The conduits 42a, 50a, 52a and 61a of FIG. 7 correspond with conduits 42, 50, 52, 55 and 61, respectively, of FIGS. 1, 2 and 3, only the opening to the circumference of the rotor 41 occurs each 120 degrees rather than every 180 degrees. Also, the supply port 38 is only 120 degrees apart from port 51, port 40 is 120 degrees from port 43, and port 53 is 120 degrees from port 54. By alternately indexing the supply conduit 37 with the passages 44 and 57, respectively, every 60 degrees instead of 90 degrees as in FIGS. 1, 2 and 3 through conduits 42a and 50a, a charge is metered to the injectors 34 at the necessary 120 degree cycle.

The distributor supply conduit 61a now indexes with three distributor ports 62, 85, 86 at 120 degree intervals. One distributor port connects with two injectors as previously explained, however, more combinations in the pairing of injectors are possible than with a four cylinder engine.

*Control of the Travel of the Hydraulically Actuated Piston for Correct Fuel Metering*

In order to control the volume of the fuel charge delivered to the injectors 34 by the shuttle piston 33 means to vary the length of stroke of the piston 33 are provided. The volume of the metered charge must change from an idling charge to that required for maximum horsepower at rated speed. A cam shaped groove 87 on the manually operated throttle shaft 88, working in cooperation with a tapered cam groove 90 on the slidable governor plunger or shaft 47, controls the swept volume of the fuel metering chamber 60. By swept volume is meant the area of the head of the metering piston 33 multiplied by its stroke. A slidable tappet 91, inserted between the throttle shaft 88 and piston 33 provides a fluid tight seal to form the fuel metering chamber 60, and a slidable tappet 92, inserted between shaft 47 and the other end of piston 33 provides a seal to form the hydraulic force chamber 48. The function of the shaft 47 with its tapered groove 90 will be explained shortly.

It is to be noted that the slidable tappets 91 and 92 are not essential to the operation of the metering piston 33. By sealing the area around cam groove 87 and leading conduit 57 into this area, it becomes the metering chamber 60 and the metering piston operates directly against the cam groove 87. Similarly, the area around the tapered groove or shoulder 90 on the shaft 47 becomes chamber 48 and the piston 33 would operate directly against groove 90. Preferably, however, the form illustrated having the slidable tappets is used.

In FIGS. 2 and 3, taken on the line II—II of FIG. 1, the throttle shaft 88 is shown in a position which allows the shuttle piston 33 to move through its full stroke. This would represent the wide open position. As the throttle shaft 88 is rotated in a clockwise direction by the engine operator, the groove 87 decreases in depth, causing the stroke of the shuttle piston 33 to decrease. The tappet 91 is held against the cam groove 87 by fuel pressure in the chamber 60. The maximum fuel requirements of the engine determine the stroke of the metering piston 33 and in turn the depth of the grooves 87 and 90. The grooves are shaped, therefore, to permit the maximum desired piston stroke, but no more, regardless of how much farther the throttle shaft 88 is rotated. Thus, an unauthorized changing of the throttle shaft adjusting stops (not shown) would not allow the fuel flow to the engine to go beyond the manufacturer's recommendations.

Control of fuel delivery by the groove 87 makes it possible to change the horsepower output of a series of engines having the same maximum speed by simply inserting another throttle shaft 88 with the desired groove depth and shape. The fuel pressure as determined by the regulator 31 is set high enough to take care of the maximum size engine. A tampered-proof seal can be incorporated in the retainer of the shaft 88 to deter users from changing the shaft 88 or altering the groove 87 to over-fuel the engine.

*Control of Idling, Coasting, Overspeed, and Torque*

Variable operating conditions of a diesel engine installed in a vehicle require that, in addition to the functions of accurate fuel measuring and distributing, other controls must be built into a fuel supply system. There must be controls for idle speed, overspeed, torque and fuel shut-off when coasting.

FIGS. 1–6 illustrate means for incorporating these four controls in the new fuel supply system. A slidable plunger 47, mounted in the housing, is positioned by the balance of forces between the governor weights 93 and the governor spring 94. As engine speed increases, the plunger 47 moves to the right and compresses the spring 94. Normally several springs would be used to form what is commonly called the governor spring pack, but for illustrative purposes to explain the functions of the plunger 47, only one spring 94 is shown. Plunger 47 need not rotate with the governor weights 93, though it may. A short shaft 99, also mounted in the housing and shown in FIGS. 1–3, rotates with the weights 93 and acts against the end of plunger 47.

The combined idling and coasting spill-off control circuit consists essentially of two valves in series, one manually controlled by the operator and the other by the engine governor. The first mentioned valve is in the throttle shaft 88. Whenever the throttle is in the idling or coasting position, ports 95 and 96 are connected by passage 97 drilled through the shaft 88. When the throttle is in any position other than that for idling or coasting, this valve is closed. The governor-controlled valve is a groove 98 on the plunger 47 connecting ports 100 and 101 if the engine is rotating above a predetermined minimum speed. The complete circuit which spills off fuel from the metering chamber 60 by connecting conduit 57 with the suction side of the pump 23 consists of conduits 102, 97, 103, 98, 104, 64, 32 and 22. As the two valves are in series with one another, if either valve 97 or 98 is closed, no fuel can be spilled off from the metering chamber 60, and all fuel pumped will be delivered to the injectors.

There are four combinations of positions of the two valves 97 and 98 which correspond with the four conditions of starting, idling, operating under load, and coasting.

As the engine is cranked over by the starter, it is important that fuel be delivered to the injectors as soon as possible so the engine can start quickly. It is preferable that no spill-off from the metering chamber 60 be permitted. Therefore, at least one of the valves 97 and 98 should be closed. This is accomplished by designing the governor-controlled valve 98 so that regardless of the position of the throttle shaft 88, the shoulder 105 at the edge of the groove 98 covers port 100 (see FIG. 4). Normally, the throttle would be opened slightly to permit a little more fuel to be injected when starting the engine. With a positive displacement pump the amount of fuel injected on a start can be controlled very closely by the operator. He is able to prevent excessive fuel from being delivered to the engine by opening the throttle only enough to make the start. This also helps to cut down on the amount of smoke made when starting.

When the engine has started as shown in FIG. 4, the idling control takes over. With the throttle closed so that ports 95 and 96 are connected, the relationship of the edge of the shoulder 105 with the uncovered area of the port 100 determines the spill-off from the metering chamber 60 and thus the idling speed of the engine. As the engine speeds up, the governor plunger 47 is forced to the right and shoulder 105 uncovers more of port 100 allowing more fuel to spill off. The engine speed will then drop, close off port 100 and then speed up again. By proper choice of springs 94, the reaction to changes in engine speed is very fast so that a substantially constant idling speed can be maintained. Idling speed adjustment is made by varying the initial compression of the springs 94.

Rotating the throttle shaft 88 takes the control over the engine away from the idle control valve 98. As the engine speed increases, the groove 98 continues to connect port 100 with port 101 in the throttle shaft 88 is out of index with ports 95 and 96 and no fuel is spilled off. This is the position indicated in FIGS. 1, 2 and 3 when the engine is under load.

When a vehicle coasts, all fuel to the injectors preferably should be stopped, as no power is required. Even the idling charge is not needed as the vehicle's wheels are turning the engine. Closing the throttle above idling speed opens the valve 97. Since the governor-controlled valve (groove 98) always stands open above idle speed, all fuel from the metering chamber 60 is then diverted away from the injectors and by the path of least resistance back to the pump 23. FIG. 6 shows the valve positions for the coasting situation.

To prevent overspeeding, a control is provided to shut off all fuel to the injectors 34 when the engine speed is above a predetermined maximum regardless of whether the throttle is fully open or closed. Shoulder 106 at groove 58 in the governor plunger 47 controls the overspeed shut-off. When the engine is above the maximum governed speed (FIG. 5) the plunger 47 moves to the "right," against the spring 94, and shoulder 106 cuts off ports 107 and 108 in conduit 57. A "hydrostatic block" is thus created in metering chamber 60 and conduit 57, stopping the movement of piston 33 as well as allowing no fuel to pass to the injectors. All fuel is then bypassed through the regulator 31 back to the pump 23. At any speed below the governed maximum speed, as in FIGS. 1–4 and 6, the groove 58 connects ports 107 and 108.

The last control to be described is the one which prevents excessive fuel delivery to the engine as a load pulls down the speed of the engine in a vehicle with the throttle held open. As previously mentioned, this control over torque or overloading is vitally important. In FIGS. 1–3, the fuel delivery is reduced by providing an overriding control directly on the metering piston 33 to shorten its stroke and in turn gradually reduce the flow of fuel to the injectors as speed falls off. This is accomplished by the slidable tappet 92 acting on one end against the piston 33 and on the other end against the tapered shoulder 90 on the governor plunger shaft 47. The "torque control" tappet 92 is pressure balanced by having both of its ends connected to the same supply conduit 44, 45 since chamber 110 around groove 90 leads to groove 46 on the plunger 47. A weak spring 111 is used to keep the rounded end 112 in contact with the groove 90. It is the only force the plunger 47 has to overcome as the latter fluctuates back and forth with changes in engine speed. Since the groove 90 is tapered, it acts as a wedge against the end 112 with a high mechanical advantage.

If the speed should drop off due to an increase in load, and the throttle remains fully open (the condition in which the driver does not shift to a lower gear and "lugs" the engine) the plunger 47 moves to the left and end 112 of tappet 92 begins to ride up on the tapered groove 90. This starts to shorten the stroke of the piston 33 regardless of the position of throttle 88. The length of taper translated into plunger travel vs. engine speed is the torque control range. The decrease in depth of groove 90 need only shorten the stroke a nominal amount to provide the necessary torque control. Since there is no pressure-time relationship to consider in a fuel system with a positive displacement pump, the control over torque has to do only a small part of the job as compared with the pressure-time system. Thus, a 10 to 15 percent reduction in stroke may be all that is required to provide sufficient torque control. However, the groove 90 can be tailored to meet special situations.

*FIG. 9—a Modification*

In FIG. 9, the functions of idle speed, torque control and overspeed are controlled by the multi-tapered shoulder 113 on the governor plunger 47. The construction of the slidable tappet 92 with its rounded end 112 riding now on the shoulder or groove 113 remains unchanged. The fuel shut-off for coasting remains controlled by the spill-off method. As before, when the throttle is closed, fuel spills off through the ports 100, 101 and groove 98. However, the groove 98 is now shifted to the "left" or governor weight end in relation to port 100 far enough so that the port 100 remains covered until the engine is above idling speed.

The groove 113 is made up of three tapers connected by rounded transition curves or fillets where necessary. The tapered shoulder 114 controls idle speed, tapered shoulder 115 controls torque, and shoulder 116 controls overspeed. Shoulders 114 and 115 are slight tapers as only small changes in metering piston stroke are necessary to control idle speed and torque. However, the fuel must shut off quickly after the maximum governed speed is reached, and this requires a steep taper 116 to push the tappet 92 up as fast as possible to completely stop the stroke of the piston 33.

When the engine is started, rounded end 112 of tappet 92 rides on the tapered portion 114 of plunger 47. The throttle is closed and is set for a minimum stroke for idling. If the engine should speed up with the throttle closed, plunger 47 moves to the right and end 112 rides up on taper 114 and shortens the metering stroke. This cuts down the fuel delivery and in turn engine speed. A balance is quickly reached and the engine idles at a constant speed.

As soon as the throttle shaft 88 is rotated to allow the metering piston stroke to increase, taper 114 no longer exerts any control. With an increase in speed, the plunger 47 moves farther to the right and taper 115 is the controlling taper. The direction of this taper is the reverse of the idling control taper 114. As speed increases, the tapered shoulder 115 becomes deeper and allows the stroke of the piston 33 to reach its maximum.

Some consideration must be given to the relationship between the depth of the shoulder 115 and the depth of the groove 87 on the throttle shaft 88 when using a tapered shoulder to control torque. Assume that a maximum stroke of .060 inches meets the fuel requirements for a desired horsepower rating and that a ten percent reduction in stroke provides the necessary torque control. The groove 87 must then have a maximum depth of .054 inches or 90 percent of the total stroke, and the tapered shoulder 115 must increase in depth from point 117 to point 118 a total of .006 inches. In FIG. 9 only, the depth of the groove at point 117 must be .054 inches so that with the throttle closed, the stroke theoretically would be zero. Also, assuming the throttle is held fully open and permits the full .054 of an inch depth of groove 87 to be utilized, when the maximum governed speed is exceeded, the plunger 47 moves more to the right and end 112 of tappet 92 rides up on the tapered shoulder 116. At the big end of this shoulder the diameter of the taper has increased to that of the diameter of the shaft 47. When the tappet end 112 reaches this point, the stroke of the piston 33 is shortened by the depth of the groove 113 at point 117 (which equals the depth of groove 87) and shuts off the fuel delivery to the engine.

*Injector Lubrication During Coasting*

When the fuel to the injectors 34 is cut off as on a coast, some means must be used to lubricate the injector plungers 72 of FIGS. 1 and 8 to prevent them from sticking in their bores 73. The injectors of Patent 2,997,993 and shown in cross section in FIG. 8 are supplied with the necessary lubrication to prevent them from sticking regardless of the length of coast. This is done by means of an air scavenge and lubrication circuit which carries fuel under relatively low pressure from the fuel pump to a moat or scavenge groove 125 located on the plunger 72 below the groove 76. By means of this circuit, the plunger is kept lubricated and any air working up between the plunger 72 and bore wall 73 is carried back to the tank before it has a chance to enter the metered fuel circuit.

A small flow of fuel is tapped off from passage 35 through a pressure reducing restrictor 126 and "common rail" conduit 127 leading to conduits 128. These conduits 128 each connect with conduits 130 leading into the injectors 34 and down to the ports 131 which remain indexed with moats 125 whether the plungers 72 are seated or retracted. The return passage of the scavenge and lubrication fuel to the tank 20 is made through flow restricting orifices 132, common rail return line 133 and conduit 134.

By maintaining a modest pressure and flow of fuel through the scavenge circuit, fuel is forced down the conduit 130 to the groove 125. Air bubbles leaking up the bore 73 to the groove 125 rise to the top of the injector through the same conduit 130 and are carried back to the tank by fuel flowing through orifices 132 and conduits 133, 134. If the fixed orifices 132 were not used to create pressure in the lines 128, 130, the fuel would flow from conduits 128 directly into conduits 133, 134 without entering conduits 130. Air bubbles would be carried away, but fuel would not be forced down to groove 125 to lubricate the plunger 72 when coasting.

*Operation of the Devices of FIGS. 1–9*

From the foregoing detailed description, it will be clear that the invention puts the fuel itself under pressure to act as a source of hydraulic power, both to load the metering chamber 60 and then to energize and move the shuttle piston 33 to force the fuel charge into an injector 34 by introducing the same pressurized fuel into the chamber 48. By means of the cam face 87 on the throttle lever 88, the travel of the free-floating piston 33 is controlled and this in turn controls the volume of the fuel entering metering chamber 60, and in turn distributed to the injectors 34.

The distribution of the pressurized fuel to the piston 33 to fill the metering chamber 60 and then force the charge in chamber 60 to an injector 34 is accomplished by a rotor 41 rotating at the speed of and timed with the engine crankshaft. As the rotor 41 turns, it alternately completes circuits which connect the metering chamber 60 to a selected conduit leading to a selected injector 34 at the same time that it connects the hydraulic force chamber 48 at the opposite end of piston 33 to the pump 23 which maintains the fuel under pressure. The fuel pressure drives the metering piston 33 against the fuel charge in the metering chamber 60 and pumps it to an injector 34. As the rotor 41 turns through a part of a revolution, (the number of degrees depending on the number of passages in the rotor and number of injectors to be supplied) the metering chamber 60 is next connected to the pressurized fuel source 23 through another set of rotor ports at the same time the chamber 48 is connected to passages leading back to the suction side of the pump 23. Thus, the fuel under pressure coming into chamber 60 recharges the chamber as it pushes the metering piston 33 back to a position where the metered fuel pumping cycle can be repeated.

When using this fuel system with mechanically operated injectors, advantage is taken of the cam timing of injectors to pair two selected injectors on a single distributor port at the rotor 41, because one of the pair will always be closed to receiving a charge of fuel at the time the other injector is ready to receive a charge, and vice versa. Therefore, in two revolutions of the rotor 41, all injectors 34 will have received a metered charge of fuel.

One application of my invention described above, combines the basic concept of Patent 2,670,725 to control torque by means of a speed-responsive mechanism to prevent overfueling the engine, with the resulting problems such as smoky exhaust and overloading. This is shown in FIGS. 1 to 3, and 9, where a speed-responsive engine-actuated governor (indicated diagrammatically by the weight 93) controls the axial positioning of a slidable shaft 47 with a cam surface 90 for torque control and piston valves 98 and 58 for control of idle speed and of overspeed. As the engine speed increases, the shaft 47 moves against the resistance of the return spring 94. This movement allows the piston 33 to have a greater stroke.

The relationship of the pressure-balanced, torque-controlled tappet 92 acting against the cam surface 90 changes so that with an increase in engine speed, the tappet 92 moves in a direction to allow the piston 33 to move through a greater stroke. The combination of the maximum depth of the cam groove 87 on the manually operated throttle 88 and the maximum depth of the cam surface 90 when the engine is at maximum governed speed, determines the total permissible stroke of the fuel metering piston 33, thus allowing a larger potential fuel charge to be pumped as speed increases.

If the load should increase and engine speed decrease, as when a vehicle is ascending a grade, and the driver does not shift into a lower gear to reduce the load on the engine, the governor shaft 47 will be moved by the return spring 94 which will cause the cam surface 90 to move the tappet 92 in a direction to shorten the permissible maximum stroke of the piston 33. Thus, independently of the driver, overfueling will be prevented.

Another feature of the invention is the use of a pair of valves 97 and 98, in series, one (97) manually operated by the throttle shaft and the other (98) governor operated, which work in conjunction to return to the suction side of the pump 23 the idling fuel charge that would normally be delivered to an injector 34 whenever the engine speed is above an idle and the throttle 88 is "closed." This occurs, for example, when coasting or braking with the vehicle in gear. The governor-controlled valve 98 also becomes the control for the idling speed of the engine by the relationship of the uncovered area of the port 100 opening to the valve or groove 98 on the shaft 47. More fuel is spilled off as the engine speed increases, thus bringing the speed back to the desired idle speed.

Control of overspeed of the engine is accomplished by shutting off the flow of fuel to the engine when it is above the predetermined maximum speed. This is done by the shoulder 106 cutting off the port 108 to the injector at groove 58 on the governor-actuated shaft 47.

*Pressurized Fuel Distributor and Governor Rotor Combined and a Charge Distributor Added—FIG. 10*

In FIG. 10 a further modification of the fuel system is shown. The "pressure distributing" functions of the rotor 41 are now combined with the governing functions of the plunger 47 in a new rotor-plunger 160. At the same time the "charge distributing" functions of the rotor 41 are transferred to a distributor rotor 161 which turns at camshaft speed for a four-cycle engine (or crankshaft speed for a two-cycle engine). The term "pressure-distributing" is defined as the distribution of fuel under gear pump pressure into the chamber at first one end of the metering or shuttle piston 33, forcing the fuel out of the chamber at the opposite end of the piston, and then diverting the pressure into the latter chamber to pump the fuel charge from the former chamber. The "charge distributing" function is defined as the distribution of charges pumped from the chambers at opposite ends of the piston 33 in a timed sequence to the correct fuel injector in the engine.

The new governor rotor 160 rotates also in timed relationship with the rotor 161 and with engine speed; the ratio of its speed of rotation to engine speed is dependent on the number of engine cylinders and will be explained shortly. The rotor 160 is also speed responsive in that its axial position is determined by the balance of forces between the centrifugal governor weights 93 acting on one end of the rotor and the spring or springs 94 acting on the opposite end.

The use of the governor-controlled rotor-plunger 160 produces several advantages. It is now easily possible to have both chambers 48 and 60 at opposite ends of the metering piston 33 supply fuel to the fuel injectors 34, so that the metering piston 33 pumps a fuel charge to an injector 34 on each stroke instead of every other stroke. This has the great advantage of cutting the number of pumping strokes per minute of the piston 33 in half when compared to the structure described in FIGS. 1–9. The time in which the "pressure distributing" ports on the rotor 160 can be aligned is doubled also. By adding the distributor rotor 161 in its housing 177 it is now easily possible to eliminate the pairing of injectors to a common conduit from the fuel pump, or if necessary, to pair two or more injectors which do not follow 360 degrees apart in firing order.

A cycle of operations will show how this is accomplished. Fuel under pressure from the gear pump 23 (not shown in FIG. 10) is delivered through conduit 37 to the ports 38 and 40. There are only two angling conduits 162 and 163 in the rotor 160, both lying in the same plane. (Instead of angling, each conduit 162, 163 may have two offset radial portions joined by an axial portion.) In the position shown in FIG. 10 port 38 is connected with port 56 by the angling conduit 162 so that the fuel under pressure can pass from conduit 37, through conduits 162, 57 into the chamber 60 at one end of the piston 33. At the same time that the conduit 162 connects the ports 38 and 56, the angling conduit 163 in the rotor 160 aligns with the ports 43 and 53 so that the chamber 48 at the opposite end of the piston 33 is connected to a fuel injector 34 (not shown in FIG. 10) through conduits 44, 163, 164, 165, groove 166 on rotor 161, rotor passage 167, distributor port 168 on the rotor, and into the conduit 180 leading to the injector. The quantity of fuel being pumped is determined by the swept volume of the chamber 48, which as previously described is controlled by the depth of the cam groove 87 on the throttle shaft 88. A fixed stop 49 determines the stroke of the piston 33 to the right in FIG. 10. The piston 33 is free-floating in this embodiment, there being no spring like the spring 111.

In FIG. 11 the governor rotor 160 has turned through 180 degrees. The conduit 37 under pressure is now connected to conduit 44 leading to chamber 48 by conduit 163 aligning with ports 40 and 54. Likewise, port 51 connects with port 62 through rotor conduit 162. As can be seen, the alignment of port 38 with port 56 and the alignment of port 43 with port 53 have been broken. Fuel under pressure in chamber 48 acts against the piston 33 and now pumps the fuel from chamber 60 through conduit 57, port 51, conduit 162, port 62, conduit 165 to the distributor rotor groove 166. The rotor 161 has also rotated and port 168 is aligned with the next distributor outlet (not shown in FIG. 10) leading to the next injector in the firing order.

During each revolution of the rotor 160 two fuel charges are pumped into the conduit 165 leading to the distributor rotor 161. Since a four-cycle six-cylinder engine requires six fuel charges every two revolutions of the crankshaft it follows that for a six-cylinder engine the governor rotor 160 must make three revolutions for every two of the engine or turn and one-half times engine speed. The FIGS. 12–15 showing distributor 177 modifications and sections are for a six cylinder engine, but the same governor rotor 160 with its adjacent ports can be used for an eight cylinder or twelve cylinder engine simply by changing the speed of the rotor 160. Naturally, the construction of the distributor 177 would have to be altered to accommodate more fuel outlets, but this is a component which is not incorporated in the basic pump housing casting. Thus, for an eight-cylinder four-cycle engine requiring four charges for each revolution of the crankshaft, the ratio of rotor speed to engine speed becomes four to two or the rotor turns two times engine speed. These ratios may be determined by the ratios of gears 169 on the driving shaft and 179 on the governor shaft, so that in changing from a six-cylinder engine to an eight-cylinder engine only the gears 169 and 179 need be changed. It must be kept in mind that the speed of the distributor rotor 161 remains at one-half engine speed regardless of the number of engine cylinders for a four-cycle engine.

The controls for idling and coasting spill-off are identical to those described for FIG. 4. They consist of the same two valves in series, one speed responsive and the other under operator control. The speed-responsive valve is the shoulder 105 on rotor 160 covering and uncovering idle port 100 as speed decreases or increases. The manual valve is the passage 97 through the throttle shaft 88 which, when the throttle 88 is rotated closed, the passage 97 aligns with ports 95, 96.

*Control of Overspeeding and "Runaway"—FIG. 16*

In FIGS. 10 and 16 the method of controlling overspeeding of the engine is modified from that shown in FIGS. 1–6. As the speed of the engine increases, the governor rotor 160 is forced to the "right" due to the centrifugal governor weights 93 compressing the spring 94. With the proper spring or spring pack design the position of the shoulder 171 on the rotor 160 will be just ready to uncover the high-speed spill-off port 172 when the engine reaches the predetermined maximum speed. As soon as the port 172 is uncovered, part of the charge which would normally pass through conduit 165 and on to an injector is now spilled off and passes through conduits 174, 175, ports 172, 173 and into conduits 176, 104 to the suction side of the pump 23. If the engine should speed up still more, a greater percentage of the charge is spilled off because more of port 172 is uncovered. At the same time that the port 172 is uncovered, the angling rotor conduits 162, 163 begin to pass out of alignment with ports 38, 56 and 53, 51 so that the fuel to and from the metering chambers is restricted, or if the engine speed goes high enough, completely shut off. Regardless of load or throttle opening the equilibrium overspeed position is quickly reached and is held within a very small range of r.p.m.

A very important advantage is obtained by adopting this form of overspeed control. It is now possible to prevent the engine from "running away" if the suction line 21 between the tank 20 and gear pump 23 should rupture or if the tank should become empty while the engine is running. Without some form of "runaway" control a diesel engine can destroy itself under these conditions by overspeeding. This occurs because as soon as any significant amount of air fills the supply passages between the governor rotor 160 and the injectors 34 the shut-off type of governor control of FIG. 5 loses all control over engine speed. For all practical purposes fuel oil is incompressible, and under normal conditions the fuel in the supply passage is "batched" through by a new "slug" pumped from the metering chamber 60 (FIG. 5). But air is highly compressible and will continue to force fuel to the injectors in a manner similar to a pneumatic ram as long as the injector plunger supply port 77 indexes with passages leading to the plunger chamber 78 (FIG. 8). Thus, many times the fuel charge required will be injected into the engine causing an extremely rapid acceleration of the engine to speeds which are destructive. The engine will only slow down when the expanding air behind the column of fuel in the lines to the injectors has shoved all of the fuel into the plunger chambers and then injected into the engine or when the engine has destroyed itself. Even with the engine under heavy load there is a period of uncontrolled high speed, although not as dangerous as when under light load. By opening one end of the conduits between the governor rotor 160 and the injectors 34 to the suction side of the pump 23, any air which should pass into the conduit 165 can be sucked back to the supply pump 23 and eliminate the possibility of the pneumatic ram effect. At the same time the air can no longer be effectively pumped by the shuttle piston 33 because the angling rotor conduits 162, 163 have passed out of index with their connecting ports 38, 56, and 53, 43 in FIG. 16 or 40, 54 and 51, 62 in FIG. 11. The engine simply comes up to governed speed and remains at that speed until all of the fuel in the lines has been burned with no harm to the engine.

*Operation of Second Distributor Turning at Camshaft Speed*

In FIGS. 10 and 12 the distributor rotor 161 in its housing 177 is shown in its most simple form for a six-cylinder engine. The distributing port 168, turning at one-half engine speed, in one revolution distributes six charges of fuel pumped by the piston 33 to six separate conduits 180–185, each of these conduits leading to an injector of a six cylinder engine. There is no pairing of injectors to a common conduit. The firing order 1–5–3–6–2–4 of the engine is followed by the distributor outlets 180–185 in the same sequence.

A modification to the above distributor is shown in FIGS. 13, 14, 15, and 19 where two injectors not operating 360 degrees apart have to be paired to a common distributor outlet. This situation arises when two injectors 34 of any suitable type are paired by internal fuel passages drilled in a cylinder head and the conduit from the fuel pump can only connect with an outlet from the drilled passage. The fuel charge being pumped by piston 33 enters the groove 166 on the rotor 161 and passes up the internal conduit 167 as in FIG. 12. Now, however, there are two rotor outlets, port 168 at the level indicated by section line XV—XV and shown in section in FIG. 15, and a new port 170 at the level of section line XIV—XIV and shown in FIG. 14. The outlets into the housing 177 are numbered for the firing order of the engine and are paired for a six cylinder engine 200 (FIG. 19) with three cylinder heads 196, 197, 198 and two injectors 34 per head 196, 197, 198, internally connected as by drilled fuel passages 201. The sequence of charge distribution is as follows: Port 168 aligns to allow fuel to be pumped through housing port "1," circular conduit 186 and out of the housing 177 through conduit 187 (shown in section in FIG. 15) and a fuel line 202 (see FIG. 19) to the outlet of the drilled fuel passage 201 in cylinder head number one, which is the head 196 in FIG. 19. Port 170 is cut off. The rotor 161 turns through 60 degrees and port 168 aligns with housing port "5," circular conduit 188 and out of the housing 177 through conduit 190 (also shown in section in FIG. 15) and a fuel line 203 (see FIG. 19) to the outlet of the drilled fuel passage 201 in cylinder head number three, which is the head 198 in FIG. 19. Again, port 170 is still cut off. Turning another 60 degrees port 170 now aligns with housing port "3" to permit the fuel to pass through circular conduit 191 and out of the housing 177 through conduit 192 and a fuel line 204 to the drilled fuel passage 201 in cylinder head number two, which is the head 197 in FIG. 19. Next, port 168 aligns with "6" and the fuel passes to head 198, i.e., number three. Then port 168 aligns with "2" for the charge to go to head 196, i.e., number one, and lastly port 170 aligns with "4" to pump to head 197, i.e., number two. Thus, the sequence of pumping to cylinder heads is 1–3–2–1–3–2 even though the firing order gives an apparent pumping order of 1–3–2–3–1–2.

*Torque Control by Spilling Off Part of the Fuel Charge—FIGS. 17, 18*

The normal torque curve for an engine equipped with a positive displacement pump is similar to that of curve AB in FIG. 18. While in many applications the engine is never operated at maximum throttle—full load conditions in the lower speed ranges, it may be desirable to provide a feature which would prevent overloading of the engine at these lower speeds. A simple means of doing this is seen in FIG. 17. It is a slightly different concept of torque control than that shown in FIGS. 1–9 where the control was tailored exactly for the entire speed range. In FIG. 17 a very small groove 193 is put on the rotor 160, shown here between the idle and overspeed control grooves. When the engine speed drops down to say 1500 r.p.m. the rotor 160 has moved to the "left" so that port 194, connected with the chambers 48 and 60 by conduit 174, has aligned with groove 193. Also exit port 195, opposite port 194 and leading back to the pump suction via conduit 176 has also aligned with groove 193. The size of ports 194 and 195 and rotor groove 193 are small enough so that even with full alignment only a small portion, 10–20 percent of the entire charge of fuel, will spill off and not go to the injectors. The groove 193 will only be in full or partial alignment with the ports 194, 195 over a limited speed range of approximately 1100–1500 r.p.m. (or whatever speed is desired) and would result in a torque curve of A.C. in FIG. 18. The control is not intended to be a precise one, but is to tell the operator to remove some of the load from his engine, for example, by shifting into a lower gear.

It should be emphasized that in many applications the torque control feature of the new fuel supply system is unnecessary. For example, electric generator sets and marine engines do not require control over torque. For engines equipped with the fuel metering and distributing system described herein in these types of services the cam groove 90 on the governor shaft 47 and the tappet 92 or the cam groove 193 on the rotor 160 can be eliminated. The control of the metering piston stroke is then entirely by the cam surface 87 on the manually operated throttle shaft 88, while the engine is operating in the speed range between idle and over-speed.

It should be emphasized that the fuel pump just described, while shown with mechanically actuated injectors 34 of the type in FIG. 8, can be used with many variations of injectors which mechanically inject fuel into the combustion chamber from a chamber into which a premeasured charge of fuel has been deposited.

To comply with the statute, a preferred embodiment of the invention has been described, but from this it should not be assumed that there is any intention thereby to relinquish or to disclaim other forms of apparatus, or parts of apparatus, which another manufacturer might substitute for that shown, but which would nevertheless come within the scope of the appended claims when properly construed.

What is claimed is:

1. In a fuel system for use with a compression ignition engine with fuel injectors, said system having
    a housing with a bore, a shuttle piston in said bore, with its ends defining first and second ported chambers, one in each end of said bore, means for charging fuel under pressure from a fuel source to each said chamber alternately, thereby to move said shuttle piston and discharge fuel from the opposite chamber, and means for connecting said first chamber at discharge to a fuel injector on the engine,
    the combination therewith of:
    a manually controlled throttle having a cam face operatively engageable with one end of said shuttle piston to determine the extent of movement of the shuttle piston in one direction,
    movement-limiting means engageable by the other end of said shuttle piston to determine its extent of movement in the other direction,
    control means responsive to the speed of said engine and adapted to be connected to said engine and actuated thereby, and
    fuel-regulating means movably mounted in said housing and controlled by said control means for reducing the amount of fuel delivered to said fuel injector at predetermined engine speeds regardless of the position of said manually controlled throttle cam face.

2. The system of claim 1 having means for also connecting said second chamber at discharge to a fuel injector, the fuel delivery therefrom to said fuel injector also being subject to the control of said fuel-regulating means.

3. The system of claim 1 having means for connecting said second chamber at discharge to a fuel return line to the fuel source.

4. In a fuel system for use with a compression ignition engine with fuel injectors, said system having
    a housing with a bore, a shuttle piston in said bore, with its ends defining first and second ported chambers, one in each end of said bore, means for charging fuel under pressure from a fuel source to each said chamber alternately, thereby to move said shuttle piston and discharge fuel from the opposite chamber, and means for connecting said first chamber at discharge to a fuel injector on the engine,
    the combination therewith of:
    a manually controlled throttle having a cam face operatively engageable with one end of said shuttle piston to determine the extent of movement of the shuttle piston in one direction,
    movement-limiting means engageable by the other end of said shuttle piston to determine its extent of movement in the other direction, and
    speed-responsive means for reducing the amount of fuel delivered to said fuel injector at predetermined engine speeds, regardless of the position of said manually controlled throttle cam face, by moving said movement-limiting means to reduce the stroke of said shuttle piston.

5. The system of claim 1 in which said means for connecting said first chamber to said fuel injectors is a distributor with a rotor rotating at a speed that distributes a fuel charge to each said injector for each revolution of said rotor, said rotor being synchronized with said means for charging fuel under pressure alternately to said ported chambers.

6. The system of claim 5 in which said engine has a plurality of cylinder heads, each cylinder head having at least two cylinders therein with a fuel injector for each cylinder in each said head and wherein said means for connecting includes conduits each joining said distributor to at least two fuel injectors, one of which is always closed when the other is open, and means for distributing the fuel charges to said fuel injectors common to said cylinder head in sequence.

7. The system of claim 1 in which each fuel injector is adjacent a combustion chamber and includes a fuel injector housing having a bore therein, a plunger reciprocable in said bore, a fuel-receiving chamber formed in said bore upon retraction of said plunger, means for moving said plunger in said bore to inject the fuel from said fuel-receiving chamber into said combustion chamber, and in which the means connecting said first chamber to a fuel injector includes a conduit connected at one end to said first chamber and at its other end to two or more of said fuel injectors, whereby said reciprocable plunger in each of said fuel-injector housings controls the time of deposit of fuel in each thereof from said first chamber and functions as part of the fuel distributing mechanism for the engine.

8. The system of claim 7 wherein said second chamber is similarly connected to two or more fuel injectors.

9. The system of claim 1 as applied to a four-cycle engine and in which fuel injector is adjacent a combustion chamber and includes a fuel-receiving chamber, a plunger mechanically actuated in said fuel-receiving chamber to force a fuel charge pumped to said fuel-receiving chamber into said combustion chamber, a single conduit connecting said first chamber to a selected pair of fuel injectors, which inject their charge of fuel at different times so that when the passage to the fuel-receiving chamber in one is open, the other is closed; whereby said injector plungers function as part of the fuel-distributing mechanism for the engine.

10. In a fuel system for use with a compression ignition engine with fuel injectors and a governor, said system having
    a housing with a bore, a shuttle piston in said bore, with its ends defining first and second ported chambers, one in each end of said bore, a fuel reservoir, a fuel pump having a suction side connected to said reservoir, means for charging the fuel under pressure from said fuel pump to each said chamber alternately, thereby to move said shuttle piston and discharge fuel from the opposite chamber, and means for connecting said first chamber at discharge to a fuel injector on the engine,
    the combination therewith of:
    a manually controlled throttle having a cam face operatively engageable with one end of said shuttle piston to determine the extent of movement of the shuttle piston in one direction,
    movement-limiting means engageable by the other end of said shuttle piston to determine its extent of movement in the other direction, and means controlled by said governor for reducing the amount of fuel delivered to said fuel injector at predetermined engine speeds by returning a controlled portion of the fuel from said first chamber to said suction side of said fuel pump.

11. The system of claim 10 wherein said means controlled by said governor for reducing the amount of fuel delivered to said fuel injector includes normally closed first valve means in said housing opened by said governor at all speeds above idle speed, and second normally-closed valve means in said housing opened by said throttle when said throttle is closed, said first valve means enabling passage of said fuel through said means for connecting said second valve means and providing a lower-resistance passage from said first chamber to the suction side of said fuel pump, said first valve means being closed at engine speeds below idle speed.

12. The system of claim 11 wherein said means controlled by said governor for reducing the amount of fuel delivered to said fuel injector, also shuts off the supply of fuel to said fuel injector when said engine exceeds a predetermined maximum speed, said shut-off being accomplished by third normally closed valve means in said housing, said housing having a passage leading from said third valve means to said suction side of said fuel pump, said governor causing said means controlled by said governor to open said third valve means at said predetermined maximum engine speed.

13. The system of claim 11 wherein said means controlled by said governor also reduces the amount of fuel delivered to said fuel injector at predetermined intermediate speeds lying between idle speed and said maximum speed by fourth normally closed valve means in said housing, said housing having a passage leading from said fourth valve means to the suction side of said fuel pump, said governor causing said means controlled by said governor to open said fourth valve means at said predetermined intermediate speeds.

14. The system of claim 10 wherein said means controlled by said governor for reducing the amount of fuel delivered to said fuel injector includes first valve means in said housing controlled by said governor and opened thereby at all speeds above idle speed and second valve means in said housing, normally closed, opened by the throttle when said throttle is closed for returning fuel from said first chamber to said suction side of said fuel pump and wherein there is additional means controlled by said governor to reduce the stroke of said shuttle piston above a predetermined maximum speed, by moving said movement-limiting means, thereby reducing the amount of fuel sent to said fuel injectors.

15. In a fuel system for use with a compression ignition engine with fuel injectors, said system having
a housing with a bore, a shuttle piston in said bore, with its ends defining first and second ported chambers, one in each end of said bore, a fuel source, a fuel pump connected to said fuel source,
conduit means for charging fuel under pump pressure to each said chamber alternately, thereby to move said shuttle piston and discharge fuel from the opposite chamber, and a conduit means for connecting each said chamber at discharge to a fuel injector on the engine,
the combination therewith of:
a manually controlled throttle having a cam face operatively engageable with one end of said shuttle piston to determine the extent of movement of the the shuttle piston in one direction,
movement-limiting means engageable by the other end of said shuttle piston to determine its extent of movement in the other direction,
engine-speed responsive means, and
a plunger-rotor rotating at a speed synchronized with the speed of the engine to open and close the connection from said fuel pump by said conduit means for charging fuel to each said chamber alternately, to open and to close the conduit means from each chamber to fuel injectors alternately, all in synchronism with said fuel injectors, and moving axially under control of said engine-speed responsive means to reduce the amount of fuel delivered to said fuel injector at predetermined engine speeds regardless of the position of said throttle.

16. In a fuel system for use with a compression ignition engine with fuel injectors and a governor, said system having
a housing with a bore, a shuttle piston in said bore, with its ends defining first and second ported chambers, one in each end of said bore, a fuel reservoir, a fuel pump having a suction side connected to said reservoir,
means for conducting the fuel under pressure from said fuel pump to each said chamber alternately, thereby to move said shuttle piston and discharge fuel from the opposite chamber, means including a delivery conduit for connecting the chamber being discharged to a fuel injector on the engine,
the combination therewith of:
a manually controlled throttle having a cam face operatively engageable with one end of said shuttle piston to determine the extent of movement of the shuttle piston in one direction,
movement-limiting means engageable by the other end of said shuttle piston to determine its extent of movement in the other direction,
a fuel-return conduit connecting said delivery conduit to the suction side of said pump, and
a valve in said fuel-return conduit controlled by said governor so as to be closed below a predetermined maximum engine speed and open above that speed, the opening becoming larger with greater speed,
whereby, when said engine reaches its predetermined maximum speed, said valve regulates the maximum speed of said engine by controlling the flow rate of fuel back to the suction side of said pump and whereby if air should be sucked into said fuel pump, it will be drawn away from said delivery conduit through said fuel-return conduit, so that the engine will not run away.

17. The system of claim 16 in which the means for conducting fuel under pressure alternately to said ported chambers starts to shut off whenever said engine begins to exceed its predetermined maximum speed.

18. The system of claim 16 in which said means for conducting fuel under pressure alternately to said ported chambers and said governor-controlled valve for regulating the maximum speed of said engine are incorporated on a single rotor-plunger rotating at a speed synchronized with engine speed and positioned axially by said governor.

19. The system of claim 16 having a second fuel-return conduit leading from said ported chambers to the suction side of said fuel pump, and a throttle-controlled valve in said second fuel-return conduit actuated by said throttle to be closed when the throttle is open and open when the throttle is closed, whereby when the engine is rotating above an idle speed and said throttle is closed, said throttle-controlled valve is open to carry to said suction side the charge pumped from said ported chambers, in order to prevent said fuel charge from going to said fuel injectors.

20. The system of claim 19 in which there is a second governor-controlled valve in said second fuel-return conduit which is fully closed at cranking speed, is opened somewhat at idle speed, and is fully opened when said engine is rotating above idle speed, whereby when said engine is idling with said throttle closed, said second governor-controlled valve regulates the idling speed of said engine by controlling the flow-rate of the fuel being returned to said suction side.

21. The system of claim 20 having a third fuel-return conduit by passing the first-named fuel-return conduit, and a third governor-controlled valve in said third conduit, which is open only when said engine is rotating between two predetermined speeds in the normal operating range of said engine, whereby when said engine rotates between said two predetermined speeds a part of said fuel charge is returned to said suction side to prevent said engine from becoming overloaded.

22. The system of claim 21 in which said means for conducting fuel under pressure alternately to said ported chambers and all of said governor-controlled valves are incorporated on a single rotor-plunger rotating at a speed synchronized with engine speed and positioned axially by said governor.

23. A fuel system for incorporation with a compression ignition engine which has pistons connected to a crankshaft to reciprocate the pistons in their respective cylinders, and nozzle injection means in each cylinder to introduce a charge of fuel into the combustion chamber of each cylinder, said fuel system including a housing having a bore therein, a metering piston reciprocable in said bore, a manually controlled throttle having a cam face operatively engageable with one end of said metering piston for varying the extent of movement of the metering piston in one direction, a speed responsive means engageable with the other end of said metering piston to determine the extent of movement of the latter in the other direction, a ported fuel-charge measuring chamber in one end of said bore with one end of said metering piston forming a movable end wall for said chamber, power applying means operative on the end of said metering piston opposite from said measuring chamber for moving said metering piston toward said measuring chamber end of said bore, means for conducting fuel under pressure to said ported fuel-charge measuring chamber, means synchronized with the crankshaft of said engine for connecting the fuel-charge measuring chamber to said fuel source to charge said chamber and thereby move said metering piston outwardly for its throttle-determined stroke and thereafter to connect said chamber to one of the nozzle injection means in one of said engine cylinders while said power-applying means operates to move said metering piston to force the fuel charge to said nozzle injection means, and thereafter to connect said fuel-charge measuring chamber to said fuel source to recharge said chamber preparatory to another injection charging stroke, whereby said speed reponsive means will override the manually controlled throttle cam to reduce the stroke of said metering piston to prevent overfueling of the engine as engine speed falls off due to load increase.

24. The device of claim 23 in which the nozzle injection means for each cylinder combustion chamber includes a housing having a bore therein, a plunger reciprocable in said bore, a fuel-receiving chamber formed in said bore upon retraction of said plunger, means for moving said plunger in said bore to inject the fuel from said receiving chamber into said combustion chamber, and in which the means synchronized with the crankshaft of the engine to connect said fuel-charge measuring chamber to said nozzle injection means includes a conduit connected at one end to said fuel charge measuring chamber and at its other end to two or more of said nozzle injection housings, whereby said reciprocable plunger in each of said housings controls the time of deposit of fuel in each thereof from said measuring chamber and functions as part of the fuel distributing mechanism for the engine.

25. A fuel system for incorporation with a compression ignition engine which has pistons connected to a crankshaft to reciprocate the pistons in their respective cylinders, and nozzle injection means in each cylinder to introduce a charge of fuel into the combustion chamber of each cylinder, said fuel system including a housing having a bore therein, a metering piston reciprocable in said bore, a manually controlled throttle having a cam face operatively engageable with one end of said metering piston for varying the extent of movement of the metering piston in one direction, a cam engageable by the other end of said metering piston to determine the extent of movement of the latter in the other direction, a ported fuel-charge measuring chamber in one end of said bore with one end of said metering piston forming a movable end wall for said chamber, power applying means operative on the end of said metering piston opposite from said measuring chamber for moving said metering piston toward said measuring chamber end of said bore, means for conducting fuel under pressure to said ported fuel-charge measuring chamber, means synchronized with the crankshaft of said engine for connecting the fuel-charge measuring chamber to said fuel source to charge said chamber and thereby move said metering piston outwardly for its throttle-determined stroke and thereafter to connect said chamber to one of the nozzle injection means in one of said engine cylinders while said power-applying means operates to move said metering piston to force the fuel charge to said nozzle injection means, and thereafter to connect said fuel-charge measuring chamber to said fuel source to recharge said chamber preparatory to another injection charging stroke, means responsive to the speed of said engine for positioning said last-named cam means whereby the higher the r.p.m. of said engine, the greater the stroke allowed to said metering piston, thereby controlling the travel permitted to the metering piston and correspondingly controlling the size of the fuel-measuring chamber, whereby the swept volume of the measuring chamber is reduced as the engine speed is reduced, even though the cam face on the manually-controlled throttle is held stationary.

26. A fuel system for incorporation with a compression ignition internal combustion engine which has pistons connected to a crankshaft to reciprocate the pistons in their respective cylinders, and nozzle injection means in each cylinder to introduce a charge of fuel into the combustion chamber of each cylinder, said fuel system including a housing having a bore therein, a metering piston reciprocable in said bore, a tappet-like piston also reciprocable in said bore, a throttle control having a cam face, operatively engageable with said tappet-like piston to determine the extent of movement of said metering piston in the direction of said cam face, a tappet-like piston reciprocable in said bore on the opposite end of said metering piston from the first-mentioned tappet-like piston, means for spacing apart the end meeting faces of said metering piston from the adjacent end faces of said tappet-like pistons to provide a chamber for access of fluid to said faces, a first port in the bore in said housing positioned to be aligned with the chamber formed between the face of said metering piston and the face of said first-named tappet-like piston, a second port in the bore in said housing positioned to be aligned with the chamber formed between the other face of said metering piston and the face of said second-named tappet-like piston, means for putting the fuel under a predetermined pressure, means synchronized with the crankshaft of the engine, for feeding said pressurized fuel alternately through said first port to its aligned chamber and then through said second port to its aligned chamber, means when said fuel is connected to said first port for connecting said second port to a fuel return line, means when said fuel is connected to said second port for connecting said first port to the nozzle injection means in a predetermined one of said engine cylinders, cam means operatively engageable with said second tappet-like piston for determining its position axially in said bore, means responsive to the speed of said engine for positioning said cam means whereby the higher the r.p.m. of said engine the farther outward axially in said bore the second tappet-like piston can travel, thereby controlling the travel permitted to the metering piston and correspondingly controlling the size of the fuel-receiving chambers formed between the ends of the metering piston and the adjacent tappet-like pistons, whereby the swept volume of the chamber adjacent said first port is reduced as the crankshaft speed is reduced, even though the cam face on the manually actuated throttle control is positioned to enlarge said chamber.

27. A fuel system for incorporation with a compression ignition internal combustion engine which has pistons connected to a crankshaft to reciprocate the pistons in their respective cylinders, and nozzle injection means in each cylinder to introduce a charge of fuel into the combustion chamber of each cylinder, said fuel system including a housing having a bore therein, a metering piston reciprocable in said bore, a manually controlled throttle having a cam face operatively engageable with one end of said metering piston for varying the extent of movement of the metering piston in one direction, a stop engageable by the other end of said metering piston to determine the extent of movement of the latter in the other direction, a ported fuel-charge measuring chamber in one end of said bore with one end of said metering piston forming a movable end wall for said chamber, power applying means operative on the end of said metering piston opposite from said measuring chamber for moving said metering piston toward said measuring chamber end of said bore, means for conducting fuel under pressure to said ported fuel-charge measuring chamber, means synchronized with the crankshaft of said engine for connecting the fuel-charge measuring chamber to said fuel source to charge said chamber and thereby move said metering piston outwardly for its throttle-determined stroke and thereafter to connect said chamber to one of the nozzle injection means in one of said engine cylinders while the power-applying means operates to move said metering piston to force the fuel charge to said nozzle injection means, and thereafter to connect said fuel-charge measuring chamber to said fuel source to recharge said chamber preparatory to another injection charging stroke, and in which said manually operable throttle also controls a valve in the conduit leading from said fuel-charge measuring chamber to said fuel source, whereby when the engine is rotating above an idle speed and said throttle is closed, said valve will be open to carry to said fuel source the charge pumped from said fuel-charge measuring chamber in order to prevent said fuel charge from going to said nozzle injection means.

28. A fuel system for incorporation with a compression ignition internal combustion engine which has pistons connected to a crankshaft to reciprocate the pistons in their respective cylinders, and nozzle injection means in each cylinder to introduce a charge of fuel into the combustion chamber of each cylinder, said fuel system including a housing having a bore therein, a metering piston reciprocable in said bore, a manually controlled throttle having a cam face operatively engageable with one end of said metering piston for varying the extent of movement of the metering piston in one direction, a stop engageable by the other end of said metering piston to determine the extent of movement of the latter in the other direction, a ported fuel-charge measuring chamber in one end of said bore with one end of said metering piston forming a movable end wall for said chamber, power applying means operative on the end of said metering piston opposite from said measuring chamber for moving said metering piston toward said measuring chamber end of said bore, means for conducting fuel under pressure to said ported fuel-charge measuring chamber, means synchronized with the crankshaft of said engine for connecting the fuel-charge measuring chamber to said fuel source to charge said chamber and thereby move said metering piston outwardly for its throttle-determined stroke and thereafter to connect said chamber to one of the nozzle injection means in one of said engine cylinders while said power-applying means operates to move said metering piston to force the fuel charge to said nozzle injection means, and thereafter to connect said fuel-charge measuring chamber to said fuel source to recharge said chamber preparatory to another injection charging stroke, and in which there is a governor-controlled valve which is fully opened when said engine is rotating above an idle speed and is in the conduit leading from said valve in the throttle controlling the flow of fuel to said fuel source, whereby when said engine is idling with said throttle closed, said governor-controlled valve will regulate the idling speed of said engine by controlling the flow rate of fuel back to said fuel source.

29. The system of claim 15 wherein the plunger-rotor has a pair of conduits with axially offset ends that perform the opening and closing of the conduit means from each chamber to the fuel injectors, each rotor conduit first connecting one of said ported chambers to said fuel pump and second, half a revolution of said rotor later, connecting that said ported chamber to a fuel injector.

References Cited in the file of this patent
UNITED STATES PATENTS
2,110,405    Starr _____ Mar. 8, 1938

FOREIGN PATENTS
1,162,601    France _____ Apr. 14, 1958

UNITED STATES PATENT OFFICE
CERTIFICATE OF CORRECTION

Patent No. 3,143,104　　　　　　　　　　　August 4, 1964

Clessie L. Cummins et al.

It is hereby certified that error appears in the above numbered patent requiring correction and that the said Letters Patent should read as corrected below.

Column 1, line 62, for "AT" read -- ART --; column 2, line 41, for "least" read -- less --; column 8, line 51, for "tampered-proof" read -- tamper-proof --; column 14, line 43, after "turn" insert -- one --; column 18, line 46, before "fuel" insert -- each --; column 19, line 31, for the claim reference numeral "11" read -- 12 --; column 23, line 35, for "the" read -- said --.

Signed and sealed this 1st day of June 1965.

(SEAL)
Attest:

ERNEST W. SWIDER
Attesting Officer

EDWARD J. BRENNER
Commissioner of Patents